Patented Aug. 2, 1938

2,125,490

UNITED STATES PATENT OFFICE 2,125,490

MANUFACTURE OF AROMATIC ALCOHOL

Harold S. Davis, Bound Brook, N. J., assignor to The Calco Chemical Company, Inc., Bound Brook, N. J., a corporation of Delaware No Drawing. Application October 18, 1935, Serial No. 45,580

11 Claims. (Cl. 260—153)

This invention relates to an improved process for producing aralkyl alcohols and especially phenylethyl alcohol.

In the past, phenylethyl alcohol has been produced by various methods and recently a new process has been developed involving the reaction of ethylene oxide and benzene in the presence of anhydrous aluminum chloride. This process of producing phenylethyl alcohol, although superior to former processes, gives rather poor yields based on the ethylene oxide and presents a serious purification problem due to the fact that the phenylethyl alcohol obtained is contaminated with a large amount of byproducts. The process is also a batch process and the outputs obtainable from equipment are small, resulting in a comparatively high fixed charge for the plant.

I have found that one of the main reasons for the poor yields of the former process lies in the fact that when the concentrations both of reaction product of ethylene oxide, benzene and aluminum chloride, namely the complex aluminum compounds containing phenylethyl alcohol and HCl and unreacted ethylene oxide become large, a second reaction takes place between the ethylene oxide and the reaction products which consumes ethylene oxide and does not form phenylethyl alcohol thus lowering the yield as well as contaminating the phenylethyl alcohol produced. In the prior art batch process, the concentration of the reaction product of ethylene oxide, benzene and aluminum chloride, which is small to start with, gradually rises and correspondingly the undesired side reaction also increases.

According to the present invention, the reaction product of ethylene oxide, benzene and aluminum chloride is removed from the zone of reaction sufficiently rapidly to prevent building up a sufficient concentration of this product to result in any serious side reactions with further portions of ethylene oxide. The removal may be either intermittent or continuous. From the standpoint of yield, it is of course not material whether the reaction product is removed intermittently or continuously so long as its concentration in the reaction zone is kept sufficiently low. However, while in its broader aspects the invention is not limited to a continuous removal of the reaction product from the reaction zone, this modification presents numerous advantages. In the first place, outputs from a given size of equipment can be very greatly increased for reasons which will be set forth in greater detail below. In the second place, a continuous removal of the reaction product gives the lowest possible concentration of reaction product in the zone of reaction in contact with ethylene oxide and therefore results in the lowest amount of side reaction. While the present invention is primarily directed to maintaining a low concentration of reaction product, it is also desirable to keep down the concentration of ethylene oxide with respect to solid aluminum chloride since this component enters into both the primary reaction and the undesired secondary reaction. From this point of view, the continuous process is also desirable as ethylene oxide can be added continuously and rapidly without building up an undesirably high concentration in the reaction zone. The exact concentration of reaction product will vary with the conditions of reaction.

One of the most serious difficulties from an operating standpoint lies in the necessity for very vigorous cooling since side reactions take place at greatly increased speed at higher temperatures. This necessitates a very vigorous cooling because of the exotherm of the reaction and because of the relatively high freezing point of benzene which does not permit cooling benzene to a temperature much below reaction temperature. Accordingly, large cooling surfaces per unit of reaction are necessary, and these can be provided in a continuous process much more effectively than in a batch process. As a result of these factors, the present invention permits, particularly when the continuous modification is employed, high yields based on both ethylene oxide and aluminum chloride, together with an enormously increased output per unit size of apparatus. Thus, for example, a small continuous unit consisting of a strongly cooled centrifugal pump as a reaction chamber and having a capacity of .8 gal. when compared to a 300 gal. unit used in the batch process of the prior art, gives the following results:

| Operation | Batch | Continuous |
|---|---|---|
| Rate of production of phenylethyl alcohol | 4 lbs./hour | 4.4 lbs./hour |
| Yield based on ethylene oxide | 48% | 61% |
| Benzene consumed per lb. of phenylethyl alcohol | 0.64 lb. | 0.64 lb. |
| Benzene recycled per lb. of phenylethyl alcohol | 20 lbs. | 8 lbs. |
| Aluminum chloride per lb. of phenylethyl alcohol | 3 lbs. | 1.2 lbs. |
| Ethylene oxide per lb. of phenylethyl alcohol | 0.76 lb. | 0.59 lb. |

The present invention will be described in conjunction with a specific example which is illustrative of a typical application.

Example

A precooled solution of ethylene oxide in benzene is mixed with a concentrated suspension of aluminum chloride, for example, by feeding the two solutions into the suction side of a powerfully cooled centrifugal pump or any other suitable type of mixer. The mixture being ejected from the pump, which serves as a reaction chamber, passes into a settling chamber, preferably also cooled by means of coils. The violent agitation of the mixture, in passing through the reaction chamber, permits a very thorough dispersion of the ethylene oxide and aluminum chloride with a correspondingly large surface of contact and rapid reaction.

In the settling chamber, the aluminum chloride is separated out by gravity which may be assisted by slowing down the flow of solution through the chamber by means of baffles, screens or the like, and a clear solution of the reaction product in benzene is continuously withdrawn from the settling chamber and then passes to a hydrolysis chamber where it is hydrolyzed by water in the usual way, but preferably continuously, for example, by mixing it with a stream of water in a pump. The hydrolyzed product is run to a second settling tank where it separates into a benzene and water layer which are continuously removed. The water may be reused for hydrolysis, a certain amount being purged in order to prevent building up excessive concentrations of hydrolyzed aluminum chloride. Suitable cooling is, of course, provided to take care of heat of the hydrolysis reaction. The benezene layer contains the phenylethyl alcohol in solution and is continuously removed and purified by fractionation, the excess benzene then being recycled as is the unreacted aluminum chloride from the first settling tank. It will be apparent that both excess aluminum chloride and excess benzene, after separation from the other constituents, are reused and the process is a continuous one, requiring the addition of ethylene oxide, benzene and aluminum chloride in amounts to make up for the consumption in the reaction itself.

In the example, a continuous process has been described in conjunction with the use of strongly cooled centrifugal pumps. The reaction may, of course, be carried out with an intermittent removal of reaction product and any suitable type of equipment may be employed which provides adequate cooling and vigorous agitation.

The example describes the production of phenylethyl alcohol from benzene and ethylene oxide. The process is equally applicable to the homologues such as are obtained for example by reacting toluene or xylene on ethylene oxide to produce tolyl or xylylethyl alcohol. Similarly the aromatic hydrocarbons may be reacted with propylene or butylene oxide in order to produce the corresponding alcohols. Since toluene possesses a much lower freezing point than benzene, it is practicable to precool the suspension of aluminum chloride in tolene to a temperature quite considerably below reaction temperature and thus avoid the necessity for such extremely vigorous cooling as is necessary with benezene which cannot be precooled to as low a temperature. When precooled material is used of course a considerable portion of the heat of reaction is taken up by bringing the precooled material up to the temperature of reaction.

The specific example above is directed to producing aralkyl alcohols and hydrocarbons from mononuclear hydrocarbons in benzene series. The process is equally applicable to polynuclear hydrocarbons such as naphthalene and its homologues, anthracene, phenanthrene, etc. As these polynuclear hydrocarbons are for the most part solids, they have to react in solution. Any suitable inert solvent may be used such as carbon disulfide or in the case of very reactive polynuclear aromatic hydrocarbons such as naphthalene, the naphthalene may be dissolved in benzene. It is true, of course, that benzene is not an inert solvent, but the reactivity of naphthalene is so much greater than that of benzene that if present in suitable excess over the ethylene oxide in the reaction zone, the naphthyl ethyl alcohol is formed practically exclusively.

I claim:

1. A method of producing an alcohol having the formula $R(C_nH_{2n})OH$ in which R is an aromatic hydrocarbon radical which comprises bringing about reaction between the corresponding olefine oxide and a suspension of aluminum chloride in the aromatic hydrocarbon corresponding to R under conditions which result in sufficiently rapid removal of the reaction product from the zone of reaction to prevent a concentration of reaction product in the zone of reaction high enough to result in rapid side reactions with the olefine oxide and hydrolyzing the reaction product to produce the alcohol.

2. A method of producing an alcohol having the formula $R(C_nH_{2n})OH$ in which R is an aromatic hydrocarbon radical which comprises bringing about reaction between the corresponding olefine oxide and a suspension of aluminum chloride in the aromatic hydrocarbon corresponding to R, continuously removing the reaction product from the zone of reaction at a sufficiently rapid rate to prevent a concentration of reaction product in the zone of reaction high enough to result in rapid side reactions with the olefine oxide, hydrolyzing the reaction product to produce the alcohol by mixing with water, causing separation of the mixture into layers, withdrawing the layer of aromatic hydrocarbon, separating it from the alcohol by distillation and reusing it in the reaction.

3. A method according to claim 2 in which the olefine oxide is added continuously at such a rate that there is always present in the reaction zone a large excess of aluminum chloride and aromatic hydrocarbon.

4. A method of producing an alcohol having the formula $R(C_nH_{2n})OH$ in which R is a mononuclear aromatic hydrocarbon radical of the benzene series which comprises bringing about reaction between the corresponding olefine oxide and a suspension of aluminum chloride in the aromatic hydrocarbon corresponding to R under conditions which result in sufficiently rapid removal of the reaction product from the zone of reaction to prevent a concentration of reaction product in the zone of reaction high enough to result in rapid side reactions with the olefine and hydrolyzing the reaction product to produce the alcohol.

5. A method according to claim 4 in which the olefine oxide is added continuously at such a rate that there is always present in the reaction zone a large excess of aluminum chloride and aromatic hydrocarbon.

6. A method of producing an alcohol having the formula R(CnH2n)OH in which R is a mononuclear aromatic hydrocarbon radical of the benzene series, which comprises bringing about reaction between the corresponding olefine oxide and a suspension of aluminum chloride in the aromatic hydrocarbon corresponding to R, continuously removing the reaction product from the zone of reaction at a sufficiently rapid rate to prevent a concentration of reaction product in the zone of reaction high enough to result in rapid side reactions with the olefine oxide, hydrolyzing the reaction product to produce the alcohol by mixing with water, causing separation of the mixture into layers, withdrawing the layer of aromatic hydrocarbon, separating it from the alcohol by distillation and reusing it in the reaction.

7. A method according to claim 6 in which the olefine oxide is added continuously at such a rate that there is always present in the reaction zone a large excess of aluminum chloride and aromatic hydrocarbon.

8. A method of producing phenylethyl alcohol which comprises bringing about reaction between ethylene oxide and a suspension of aluminum chloride in benzene under conditions which result in sufficiently rapid removal of the reaction product from the zone of reaction to prevent a concentration of reaction product in the zone of reaction high enough to result in rapid side reactions with ethylene oxide and hydrolyzing the reaction product to produce phenylethyl alcohol.

9. A method according to claim 8 in which the ethylene oxide is added continuously so that there is always present in the reaction zone a large excess of aluminum chloride and benzene.

10. A method of producing phenylethyl alcohol which comprises bringing about a reaction between ethylene oxide and a suspension of aluminum chloride in benzene, continuously removing the reaction product from the zone of reaction at a sufficiently rapid rate to prevent a concentration of reaction product in the zone of reaction high enough to result in rapid side reactions with ethylene oxide and hydrolyzing the reaction product to produce phenylethyl alcohol by mixing with water, causing separation of the mixture into layers, withdrawing the benzene layer, separating benzene from the phenylethyl alcohol by distillation and reusing the separated benzene in the reaction.

11. A method according to claim 10 in which the ethylene oxide is added continuously so that there is always present in the reaction zone a large excess of aluminum chloride and benzene.

HAROLD S. DAVIS.